United States Patent

Freeman

[15] 3,650,109
[45] Mar. 21, 1972

[54] HYDRAULIC POWER TRANSMISSION SYSTEMS

[72] Inventor: Leslie Bernard Freeman, West Pennant Hill, New South Wales, Australia

[73] Assignee: Joseph Lucas (Industries) Limited, Birmingham, England

[22] Filed: May 20, 1970

[21] Appl. No.: 39,132

[52] U.S. Cl. .............................................. 60/97 E, 60/53 R
[51] Int. Cl. ................................ F02b 73/00, F16d 31/00
[58] Field of Search ........................................ 60/97 E, 53 R

[56] References Cited

UNITED STATES PATENTS 1,900,050   3/1933   Ernst ............................... 60/97 E UX
2,312,213   2/1943   Ferris ............................... 60/97 E X
2,846,849   8/1958   Levetus et al. ................... 60/97 E UX Primary Examiner—Edgar W. Geoghegan
Attorney—Holman & Stern

[57] ABSTRACT

A hydraulic power transmission system has identical pumps and identical motors connected alternately in series. The upstream and the downstream sides of the motors are respectively connected together via flow restrictors. The pumps have a variable stroke and associated with each pump is a means responsive to the pump delivery pressure for limiting the stroke.

9 Claims, 1 Drawing Figure

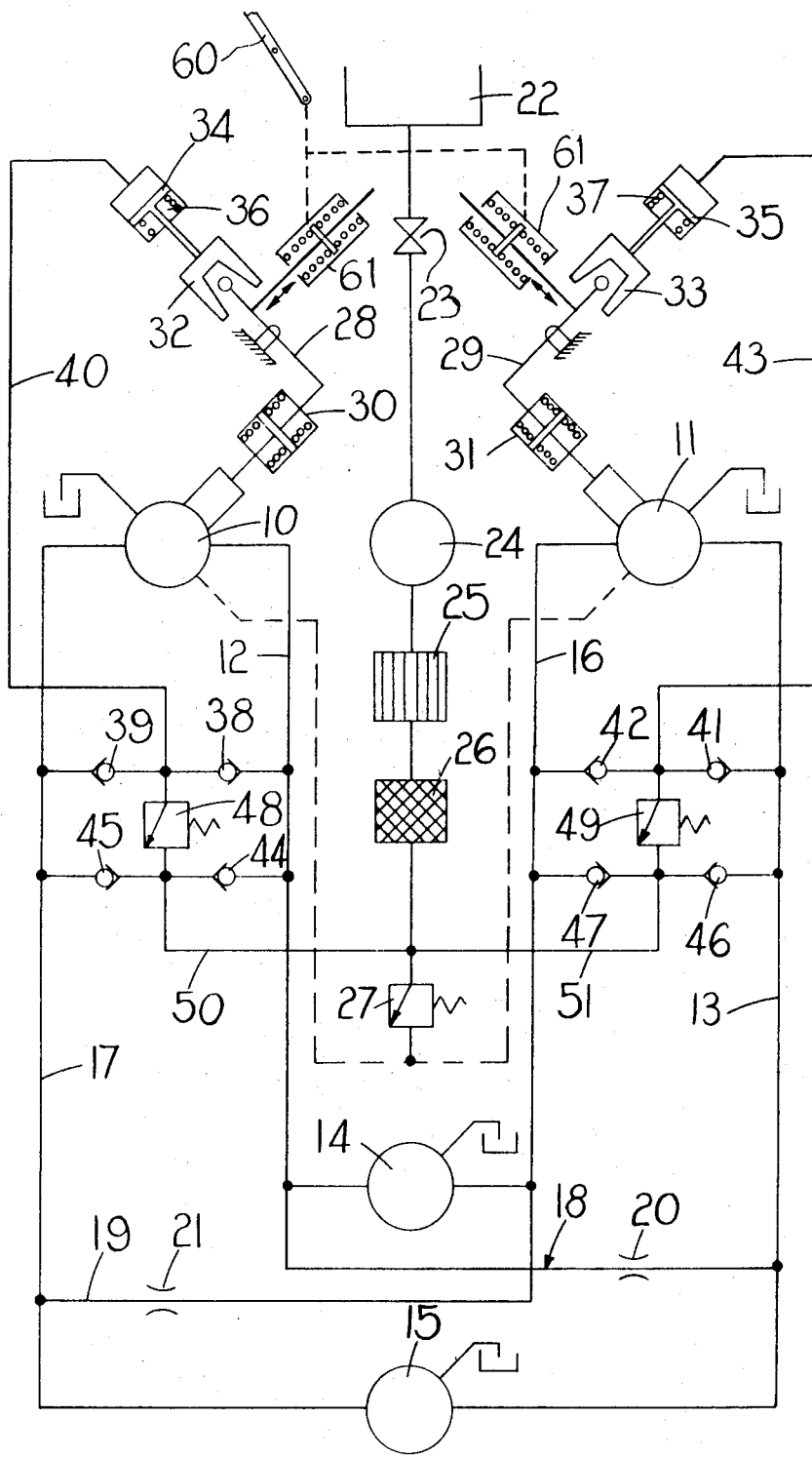

HYDRAULIC POWER TRANSMISSION SYSTEMS

This invention relates to hydraulic power transmission systems which include one or more pumps and one or more motors driven therefrom and in which the speed of the motor or motors is controlled by regulating the output of the pump or pumps.

A hydraulic power transmission system according to the invention comprises a plurality of substantially identical hydraulic pumps and an equal number of substantially identical hydraulic motors, the pumps and motors being hydraulically connected alternately in series so as to form, effectively, one or more continuous circuits, regulating means associated with each pump for varying the output thereof and means whereby the said regulating means are coupled so as to permit substantially simultaneous control of the speed of all of the said motors.

Reference will now be made to the accompanying drawing which shows diagrammatically and by way of example an apparatus in accordance with the invention.

Substantially identical hydraulic pumps 10, 11 each having its stroke variable so as to enable the output flow to be in either direction are respectively hydraulically connected by lines 12, 13 to substantially identical fixed stroke hydraulic motors 14, 15.

The motors 14, 15 are in turn respectively connected to the pumps 10, 11 by lines 16, 17. Pumps 10, 11, motors 14, 15 and lines 12, 13, 16, 17 form therefore a continuous circuit. Lines 18, 19 having restrictors 20, 21 respectively join line 12 to line 13 and line 16 to line 17.

The strokes of the pumps 10, 11 are variable by means of levers 28, 29 acting through mechanical couplings 30, 31. Cam members 32, 33 movable by actuators 34, 35 against springs 36, 37 enable the limits of movement of the levers 28, 29 to be varied. Lines 12 and 17 are connected to the actuator 34 via nonreturn valves 38, 39 and line 40. Lines 13 and 16 are connected to the actuator 35 via nonreturn valves 41, 42 and line 43. Levers 28, 29 are connected together and are operated by a convenient means 60. A link 61 is incorporated between each lever 28, 29 and the operating means whereby the operating means is not moved if either lever 28, 29 is moved by its associated cam member 32, 33.

Lines 12 and 17 are connected via nonreturn valves 44, 45 and lines 13 and 16 are connected via nonreturn valves 46, 47. A relief valve 48 connects the outlets of nonreturn valves 38, 39 to the inlets of nonreturn valves 44, 45. A relief valve 49 similarly connects the outlets of nonreturn valves 41, 42 to the inlets of nonreturn valves 46, 47.

Fluid is supplied to the pumps 10, 11 from a tank 22 via a valve 23, a pump 24, a cooler 25, a filter 26 and a relief valve 27. The inlets of the nonreturn valves 44, 45, 46, 47 are connected to the inlet of the relief valve 27 by the lines 50, 51.

In use, the pumps 10, 11 are driven by a common external means (not shown), and the motors 14, 15 are each connected to a shaft (not shown). In one direction of flow fluid passes from pump 10 via motor 14, pump 11 and motor 15 back to pump 10. The direction of flow may be reversed by varying the strokes of the pump 10, 11 as previously described. Line 18 and restrictor 20 ensure that the pressures in lines 12 and 13 remain substantially equal. Line 19 and restrictor 21 produce the same result in lines 16 and 17. The flow and pressure drop in motor 14 are therefore substantially equal to those in motor 15. The power output of the shaft of motor 14 will therefore be substantially equal to that at the shaft of motor 15.

As the pressure in line 12 or line 17 rises, this pressure will be transmitted via nonreturn valves 38, or 39 and line 40 to operate the actuator 34 so that the cam member 32 reduces the limits on the movement of the lever 28 and also urges the lever 28 to a more central position if it is outside the reduced limit. The output flow of the pump 10 is thereby limited for any level of pressure in the line 12 or line 17. The output flow of pump 11 is similarly limited by pressure in line 13 or line 16 acting via valves 41 or 42, line 43, actuator 35, cam member 33 and lever 29.

If the pressure in line 17 is less than that in line 12 by an amount greater than that set by the relief valve 48, fluid will flow from line 12 via valves 38, 48 and 45 to line 17. Likewise if the pressure in line 17 exceeds that in line 12 by an amount greater than that set by valve 48, fluid will flow from line 17 via valves 39, 48 and 44 to line 12. Valves 41, 42, 46, 47 and 49 act in a similar manner to limit the pressure difference between lines 13 and 16.

In a like manner the pressure difference between lines 12 and 16 is controlled by flow either through valves 38, 48 and 47 or through valves 42, 49, 44 and the pressure difference between lines 13 and 17 by flow either through valves 41, 49, 45 or through valves 39, 48, 46 thus enables the pressures appearing across the pumps 10, 11 and motors 14, 15 to be set to a desired level. Furthermore the pressure in any of the lines 12, 13, 16, 17 cannot exceed the pressure at the inlet of the relief valve 27.

It will be understood that a plurality of systems substantially as previously described may be used together, and that control of all the motors by a single operating means may be achieved by connecting together also substantially as previously described, the levers 28, 29 of all the systems.

An apparatus of the type described may be used to provide power transmission for a vehicle, as for example a railway locomotive, in which application each pump is driven by a main engine and each motor is coupled to an axle of the locomotive. The axles thus rotate at substantially identical speeds. Furthermore, since the power outputs of the shafts of the motors are substantially equal, each axle carries an equal share of the drive torque. In this type of application the speeds of two or more locomotives may simultaneously be controlled by connecting together several of the systems described.

Having thus described my invention what I claim as new and desire to secure by Letters Patent is:

1. A hydraulic power transmission system comprising a plurality of substantially identical hydraulic pumps and an equal number of substantially identical hydraulic motors, the pumps and motors being hydraulically connected alternatively in series so as to form, effectively, a continuous circuit, regulating means associated with each pump for varying the output thereof and means whereby the said regulating means are coupled so as to permit substantially simultaneous control of the speed of all of the said motors.

2. A system as claimed in claim 1 which includes hydraulic interconnections between the upstream sides of all the pumps and between the downstream sides of all the pumps.

3. A system as claimed in claim 2 in which the said hydraulic interconnections include flow restrictors.

4. A system as claimed in claim 1 in which the regulating means are operable to reverse the direction of flow through the pumps.

5. A system as claimed in claim 1 in which each pump has associated therewith an actuating means responsive to the delivery pressure of the pump and operatively connected to the regulating means to vary the stroke of the pump in accordance with the delivery pressure thereof.

6. A system as claimed in claim 5 in which the said actuating means comprises a piston and cylinder unit and a cam member operable by the piston and cylinder unit and engageable with the regulating means.

7. A system as claimed in claim 6 in which each actuating means is connected to both sides of its associated pump by respective nonreturn valves.

8. A system as claimed in claim 7 which includes a pressure-relief arrangement connected across each pump, each said arrangement comprising a relief valve and a plurality of nonreturn valves, the arrangement being such that a fluid may bypass any pump only through the associated relief valve.

9. A system as claimed in claim 8 in which two nonreturn valves for each pressure-relief arrangement also provide the nonreturn valves for the said actuating means.

* * * * *